(12) United States Patent
Srock

(10) Patent No.: US 11,255,358 B1
(45) Date of Patent: Feb. 22, 2022

(54) APPARATUS FOR HYDRAULIC FLUID RECLAMATION AND FOR COOLING

(71) Applicant: Bryan J. Srock, Crossvile, TN (US)

(72) Inventor: Bryan J. Srock, Crossvile, TN (US)

( * ) Notice: Subject to any disclaimer, the term of this patent is extended or adjusted under 35 U.S.C. 154(b) by 28 days.

(21) Appl. No.: 17/016,136

(22) Filed: Sep. 9, 2020

(51) Int. Cl.
| | |
|---|---|
| F17D 5/00 | (2006.01) |
| F15B 20/00 | (2006.01) |
| F15B 21/0423 | (2019.01) |
| B67D 7/32 | (2010.01) |
| F28F 11/00 | (2006.01) |
| F16L 55/168 | (2006.01) |

(52) U.S. Cl.
CPC .......... *F15B 20/005* (2013.01); *B67D 7/3209* (2013.01); *F15B 21/0423* (2019.01); *F16L 55/168* (2013.01); *F28F 11/00* (2013.01); *Y10T 137/5762* (2015.04)

(58) Field of Classification Search
CPC .. F15B 20/005; F15B 21/0423; B67D 7/3209; F16L 55/168; F28F 11/00
See application file for complete search history.

(56) References Cited

U.S. PATENT DOCUMENTS

| | | | | |
|---|---|---|---|---|
| 2,342,616 | A * | 2/1944 | O'Brien | G01M 3/2853 73/46 |
| 2,956,586 | A * | 10/1960 | Zeigler | F16L 11/20 137/563 |
| 4,445,332 | A * | 5/1984 | Thies | F16L 39/02 285/123.17 |
| 5,884,657 | A * | 3/1999 | Srock | F17D 5/04 137/312 |
| 6,039,066 | A * | 3/2000 | Selby | F16L 35/00 137/312 |
| 6,305,407 | B1 * | 10/2001 | Selby | F16L 35/00 137/312 |
| 6,889,538 | B2 * | 5/2005 | Booles | G01M 3/283 285/93 |

* cited by examiner

*Primary Examiner* — Kevin R Barss
(74) *Attorney, Agent, or Firm* — Oltman, Flynn & Kubler

(57) ABSTRACT

A manifold structure for a fluid reclamation apparatus incorporated into a hydraulic system having inner and outer fluid lines and with annular containment space between the inner and outer fluid lines for capturing fluid leaking from the inner fluid line, the manifold structure being connected to least one end the inner and outer fluid lines and contains a chamber for receiving leaked fluid from the annular space and including a manifold inner sleeve to which the inner fluid line is coupled, the inner sleeve being retained within a manifold outer sleeve to which the outer fluid line is coupled and having a lateral bore extending from the chamber and through the outer sleeve for delivering leaked fluid into a reclamation line and back into the hydraulic system, the inner sleeve being rotatably mounted within the outer sleeve by at least one O-ring seated in a groove around the inner sleeve and sealingly abutting the inner surface of the outer sleeve.

19 Claims, 9 Drawing Sheets

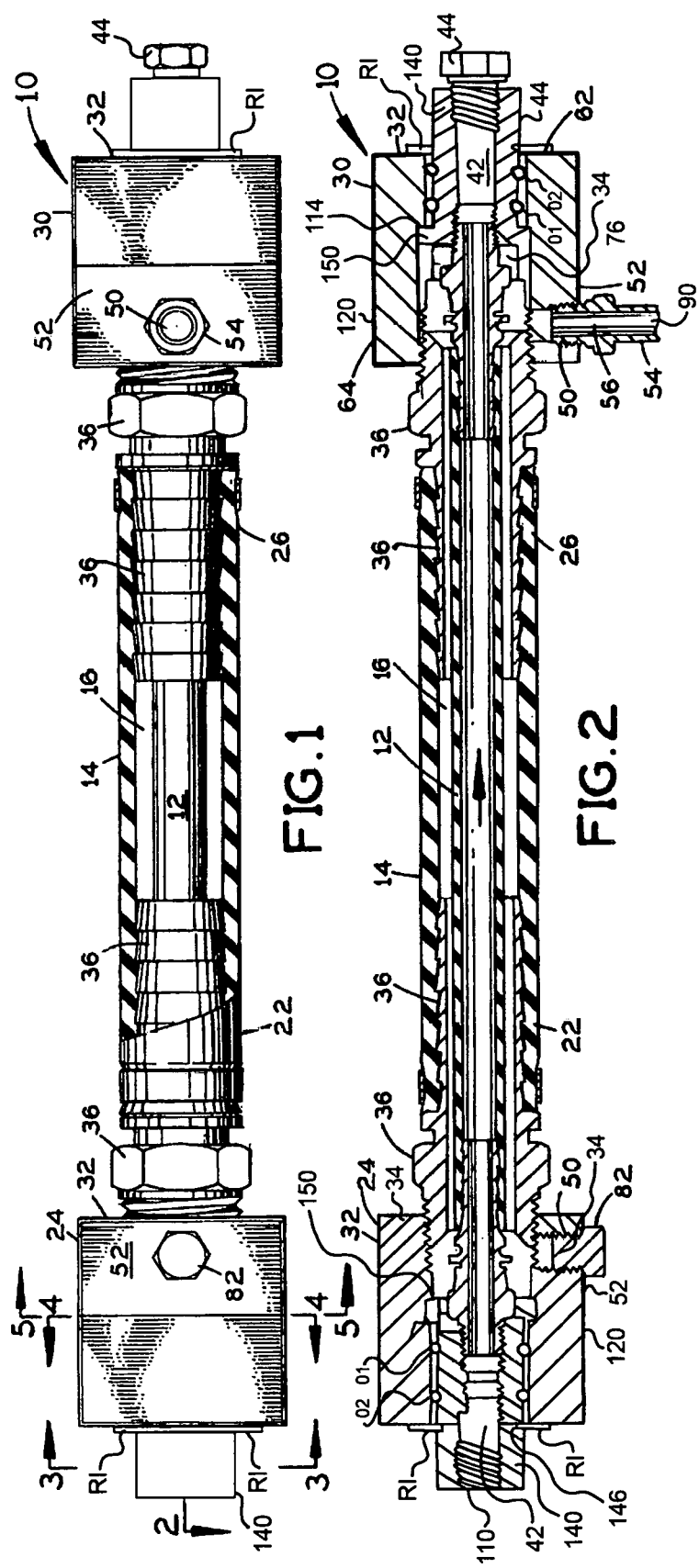

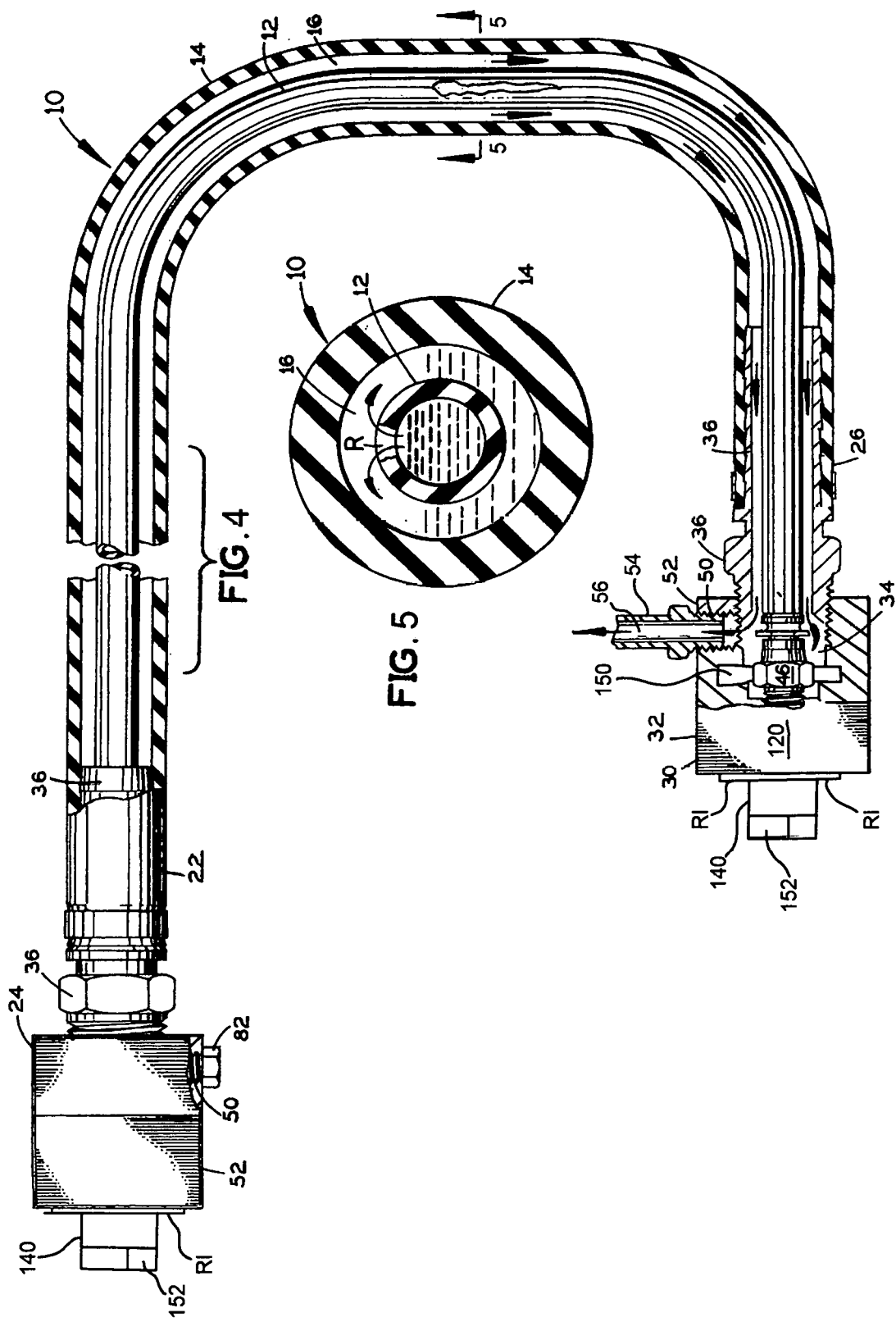

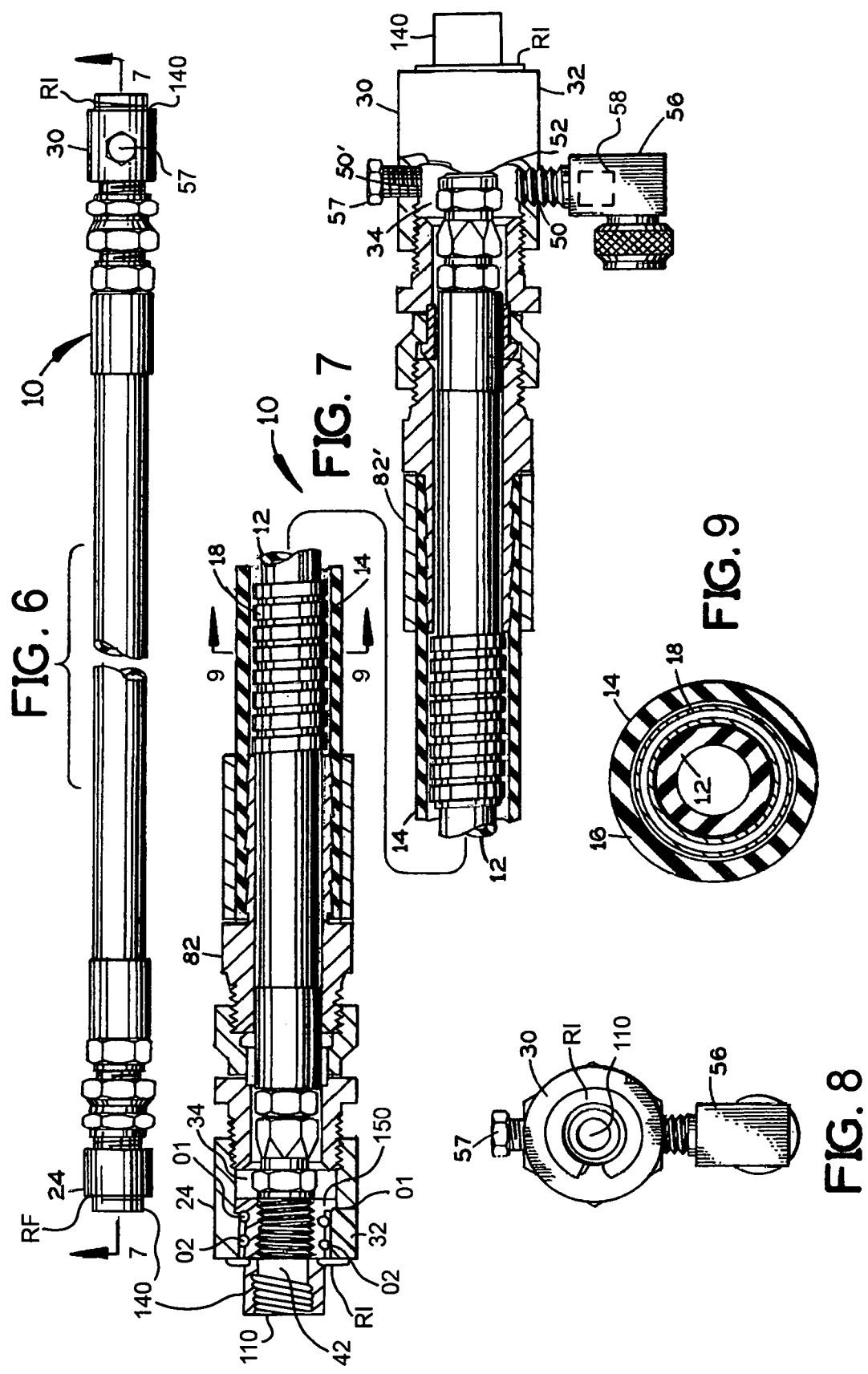

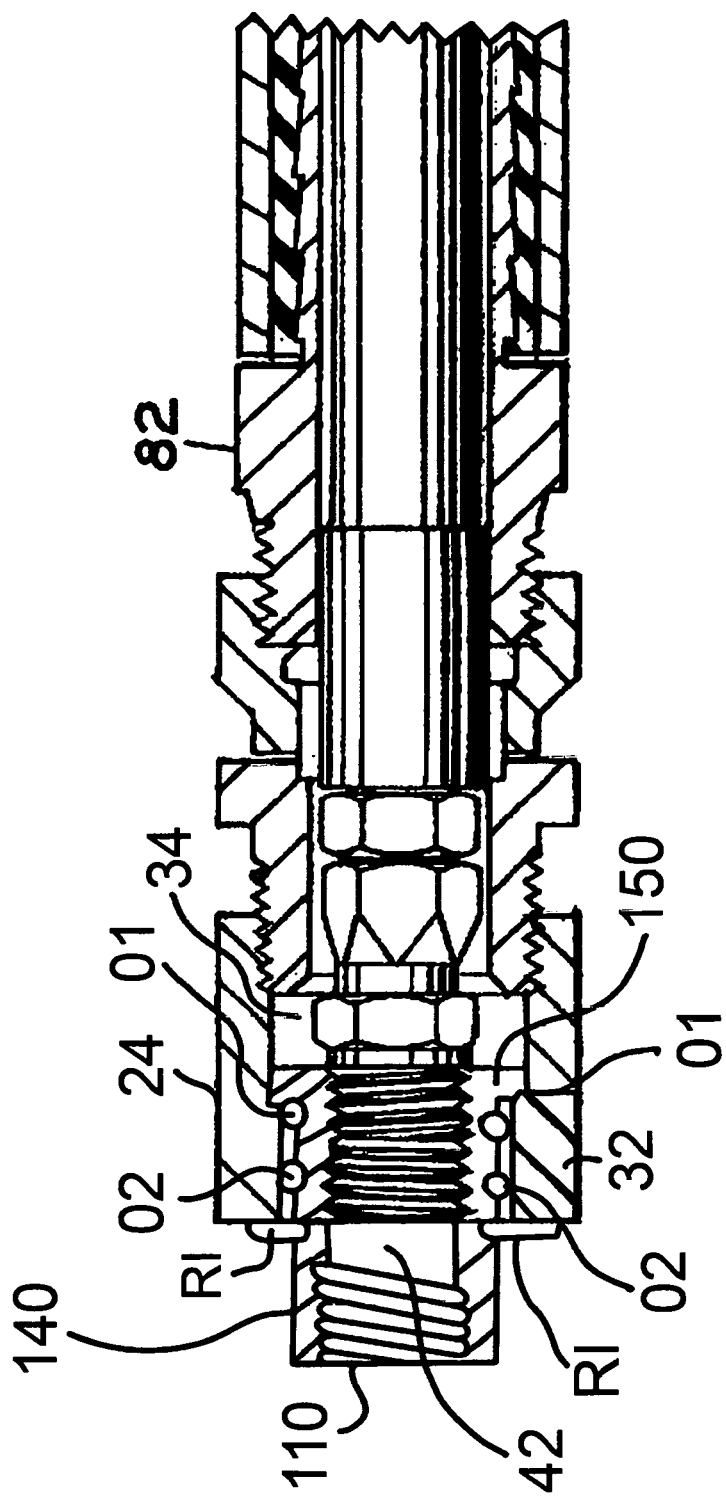

APPARATUS FOR HYDRAULIC FLUID RECLAMATION AND FOR COOLING

BACKGROUND OF THE INVENTION

1. Field of the Invention

The present invention relates generally to the field of hydraulic equipment and systems. More specifically the present invention relates to a reclamation apparatus for capturing fluid leaking from a hydraulic fluid line and delivering the fluid back into the hydraulic system.

The contents of U.S. Pat. No. 5,884,657 issued to the present applicant on Mar. 23, 1999, are incorporated herein by reference. As disclosed in this prior patent, the present apparatus includes an inner fluid line having a certain inner fluid line outside diameter for carrying hydraulic fluid between two points in a hydraulic system, such as between a fluid pump and a fluid powered mechanism. The apparatus also includes a reinforcing sleeve having a reinforcing sleeve inside diameter larger than the inner fluid line outside diameter to contain the inner fluid line. The apparatus also includes an outer fluid line having an outer fluid line inside diameter larger than the reinforcing sleeve outside diameter to contain the reinforcing sleeve and inner fluid line so that a substantially annular containment space is provided between the reinforcing sleeve and the outer fluid line. The inner and outer fluid lines are concentrically connected at a higher pressure first fluid line end to a coupling structure and at a lower pressure second line end to a manifold structure.

The present manifold structure includes a manifold block in the form of an outer sleeve through which a primary passageway extends, having two passageway segments and an inner sleeve rotatably mounted within the outer sleeve.

The first passageway segment includes an internally threaded block chamber, which receives an externally threaded outer fluid line coupler for mounting outer fluid line second line end. The second passageway segment is a guide segment in the form of a smooth bore which is concentric with and smaller in diameter than the block chamber, thereby defining a passageway shoulder between the block chamber and the receiving segment meet.

The other essential part of the manifold structure is an inner sleeve sized in outer diameter to fit with clearance into the guide segment. The block chamber end of the inner sleeve has an abutment flange which abuts passageway shoulder. The portion of the inner sleeve within the guide segment has circumferential first and second O-ring grooves, into which first and second O-rings O1 and O2 are seated to make sealing contact with the guide segment inner surface, while permitting rotation of the inner sleeve within and relative to the outer sleeve, and thus relative to manifold block. A portion of the inner sleeve protrudes longitudinally beyond the manifold structure and includes a snap ring or retaining ring groove immediately adjacent to the manifold block, into which a retaining ring is resiliently and removably fitted. The inner sleeve has a longitudinal inner sleeve fluid passageway, which receives an axially protruding inner fluid line coupler for mounting of the inner fluid line second line end. Longitudinal inner sleeve fluid passageway opens out of a face of the manifold block opposite block chamber and receives a standard nipple fitting. This concentric sleeve manifold structure construction permits the inner fluid line to rotate within and relative to the outer fluid line. Flat gripping faces preferably are provided around protruding end of inner sleeve for a wrench to grip and rotate inner sleeve relative to outer sleeve. This construction also permits fast and easy assembly and disassembly of the manifold structure and thus of the hydraulic system, through the removal of retaining ring to release the inner sleeve from the outer sleeve, and replacement of the retaining ring to secure the inner sleeve within the outer sleeve.

An alternative use of apparatus is as for cooling. A coolant reservoir containing liquid nitrogen or other coolant is provided, and is connected to the threaded lateral bore with a coolant delivery line. A fluid to be cooled, preferably a liquid, is pumped through the inner fluid line. At the same time, liquid nitrogen or other coolant is pumped through the threaded lateral bore and into annular containment space, so that it is contained within the outer fluid line and surrounds the inner fluid line, drawing heat from the fluid to be cooled.

The coupling structure may be of conventional construction, differing only in the provision of concentric line coupler fittings. The apparatus also includes a reclamation line, having a coupler with a check valve to prevent fluid backflow, to return the fluid back into the system.

In the event the inner fluid line ruptures, the fluid is contained by the outer fluid line and is subsequently delivered, through the reclamation line, back into the system. The reinforcing sleeve prevents the outer fluid line from rupturing due to the force from the inner fluid line rupture. In this way the system can continue to function until the rupture is repaired or the inner fluid line is replaced.

2. Description of the Prior Art

There have long been hydraulic systems for powering construction and industrial equipment, automobile power drive assemblies, trash compactors, and many other devices. Yet, as noted in patent previously issued to the present applicant, these systems have been subject to sudden failure upon the rupture of any line in the system containing the hydraulic fluid. Such failure often leads to long and costly shut-downs, inoperability in critical situations and to damage from the discharge of fluid onto vulnerable surrounding surfaces.

Various devices have been developed to address this problem. Such devices are shown in U.S. Pat. Nos. 2,838, 074, 4,445,332 and 2,181,002, utilize an outer hose or tube to enclose the fluid line so that leaking fluid may be captured and returned to the system. However, these devices do not prevent the outer hose or tube from rupturing due to the force or pressure caused by the fluid line rupturing. Accordingly, there was a need in the art for an apparatus which will capture fluid from a ruptured fluid line and return it to the system and which will prevent the outer hose or tube from rupturing due to the force or pressure caused by the fluid line rupturing.

The present applicant developed an earlier version of such an apparatus and received U.S. Pat. No. 5,884,657 for it. Yet applicant sought more flexibility in manifold function and greater ease of assembly and disassembly.

It is thus an object of the present invention to provide a hydraulic fluid containment and reclamation apparatus for a hydraulic system which captures fluid escaping from a ruptured hydraulic line and delivers the fluid back into the system.

It is another object of the present invention to provide such an apparatus which prevents the outer fluid line from rupturing due to the force from the inner fluid line rupture.

It is still another object of the present invention to provide such an apparatus which delivers the fluid back into the system at a point of higher fluid pressure than the pressure at the point of rupture.

It is a further object of the present invention to provide such an apparatus having a manifold which permits rotation of the inner fluid line relative to the outer fluid line.

It is a still further object of the present invention having a manifold which can be quickly and easily assembled and disassembled.

It is yet a further object of the present invention to provide such an apparatus which permits the system to continue operating until the ruptured line is either repaired or replaced.

It is an additional object of the present invention to provide such an apparatus which provides visual indication of fluid outside of the inner fluid line.

It is yet additional object of the present invention to provide such an apparatus which can be incorporated into virtually any hydraulically driven machinery, such as a cardboard box bailer or garbage truck compacting door, or cargo moving equipment on a ship.

It is finally an object of the present invention to provide such an apparatus which is inexpensive to manufacture, compact and very reliable.

SUMMARY OF THE INVENTION

The present invention accomplishes the above-stated objectives, as well as others, as may be determined by a fair reading and interpretation of the entire specification.

A reclamation apparatus is provided for capturing leaking hydraulic fluid in a hydraulic system having a higher pressure system end and a lower pressure system end and for delivering the captured fluid back into the system, including an inner fluid line for carrying hydraulic fluid between two points in the hydraulic system having a higher pressure inner fluid line first line end, a lower pressure inner fluid line second line end and inner fluid line coupler structure sealingly and engagingly mounted at the first and second line ends; a reinforcing sleeve sized to contain the inner fluid line and having a certain reinforcing sleeve outside diameter; an outer fluid line containing the inner fluid line and the reinforcing sleeve and having an outer fluid line first line end, an outer fluid line second line end, outer fluid line coupler structure sealingly and engagingly mounted at the first and second line ends, and an outer fluid line inside diameter larger than the reinforcing sleeve outside diameter so that a containment space is provided between the reinforcing sleeve and outer fluid line; a manifold structure connected to the inner and outer fluid link second line ends, the manifold structure including a manifold block in the form of an outer sleeve through which a longitudinal primary passageway extends, the primary passageway having a first passageway segment defining a block chamber which engagingly and scalingly receives the outer fluid line coupler structure for mounting the outer fluid line second line end and having a second passageway segment defining a guide segment; the manifold structure further including an inner sleeve having an inner sleeve longitudinal inner sleeve fluid passageway, the inner sleeve being sized in outer diameter to fit into the guide segment, a portion of the inner sleeve within the guide segment having a circumferential an O-ring groove, into which an O-ring is seated to make sealing contact with the guide segment, the inner sleeve being retained within the outer sleeve by inner sleeve retaining mechanism, while permitting rotation of the inner sleeve within and relative to the outer sleeve, and thus relative to the manifold block; and where the longitudinal inner sleeve fluid passageway is sized receive an axially protruding inner fluid line coupler structure for mounting the inner fluid line second line end into the inner sleeve, the longitudinal inner sleeve fluid passageway opening the manifold block opposite the block chamber for receiving a standard nipple fitting; and a lateral reclamation line having reclamation line coupler structure and being connected in fluid communication between the first lateral bore and an upstream point of the inner line coupler structure for reclaiming any leaked fluid in the containment space.

The reclamation line coupler structure preferably includes a check valve for preventing backflow of fluid into the manifold structure. The second passageway segment preferably is substantially concentric with and smaller in diameter than the block chamber, thereby defining a passageway shoulder between the block chamber and the guide segment, and where the inner sleeve has a block chamber end with a radially protruding abutment flange which abuts the passageway shoulder, where a portion of the inner sleeve protrudes longitudinally beyond the manifold structure and includes a circumferentially retaining ring groove immediately adjacent to the manifold block, into which a retaining ring is resiliently and removably fitted; the passageway shoulder, the abutment flange and the ring groove and retaining ring thereby defining the inner sleeve retaining mechanism.

The manifold structure preferably is a manifold block, the chamber is internally threaded and the outer fluid line coupler structure is externally threaded for fastening into the chamber, the longitudinal inner sleeve fluid passageway is internally threaded and the inner fluid line coupler structure is externally threaded for fastening into the longitudinal inner sleeve fluid passageway, and the first lateral bore is internally threaded and the reclamation line coupler structure is externally threaded for fastening into the first lateral bore.

The inner fluid line coupler structure preferably includes inner fluid line coupler fittings, and where the outer fluid line coupler structure includes outer fluid line coupler fittings. The guide segment preferably is a smooth bore.

The portion of the inner sleeve protruding longitudinally beyond the manifold preferably includes flat gripping faces for a wrench to grip and rotate the inner sleeve relative to the outer sleeve. The coupling structure preferably includes a second the manifold structure, where the first lateral bore is closed and sealed with a plug structure.

The reclamation line coupler structure preferably further includes a longitudinal fluid passageway having a certain inside diameter and leading to a reclamation line coupler structure chamber having a certain inside diameter greater than the reclamation line coupler structure longitudinal fluid passageway inside diameter, the inside diameters of the reclamation line coupler structure chamber and the reclamation line coupler structure longitudinal fluid passageway defining a flanged portion, and where the check valve includes a spring mounted longitudinally within the reclamation line coupler structure chamber; and a disk located between the flanged portion and the spring and having an outside diameter greater than the reclamation line coupler structure longitudinal fluid passageway inside diameter, and less than the reclamation line coupler structure chamber inside diameter, where the spring is structured and disposed to press the disk against the flanged portion until fluid buildup within the reclamation line coupler structure longitudinal fluid passageway causes the disk to compress the spring; and thereby allowing fluid to flow through the reclamation line coupler structure and into the reclamation line. The manifold structure preferably includes a second lateral bore extending between the block chamber and a second side of the manifold block opposite the first side of the manifold block and a sight glass for providing visual indication of fluid outside of the inner fluid line, the second lateral bore being internally threaded and the sight glass externally threaded for fastening into the second lateral bore.

A reclamation apparatus is further provided for capturing leaking hydraulic fluid in a hydraulic system having a higher pressure system end and a lower pressure system end and for delivering the captured fluid back into the system, including an inner fluid line for carrying hydraulic fluid between two points in the hydraulic system having a higher pressure first line end and a lower pressure second line end; a reinforcing sleeve sized to contain the inner fluid line and having a certain reinforcing sleeve outside diameter; an outer fluid line sized to contain the reinforcing sleeve and the inner fluid line and having a first line end, a second line end and an outer fluid line inside diameter larger than the reinforcing sleeve outside diameter so that a containment space is provided between the reinforcing sleeve and the outer fluid line; a line coupling structure connected to the inner and outer fluid line first line ends; a manifold structure connected to the outer fluid line, the manifold structure including a manifold block in the form of an outer sleeve through which a longitudinal primary passageway extends, the primary passageway having a first passageway segment defining a block chamber which engagingly and sealingly receives the outer fluid line coupler structure for mounting the outer fluid line second line end and having a second passageway segment defining a guide segment; the manifold structure further including an inner sleeve having an inner sleeve longitudinal inner sleeve fluid passageway, the inner sleeve being sized in outer diameter to fit into the guide segment, a portion of the inner sleeve within the guide segment having a circumferential an O-ring groove, into which an O-ring is seated to make sealing contact with the guide segment, the inner sleeve being retained within the outer sleeve by inner sleeve retaining structure, while permitting rotation of the inner sleeve within and relative to the outer sleeve, and thus relative to the manifold block; where the longitudinal inner sleeve fluid passageway is sized receive an axially protruding inner fluid line coupler structure for mounting the inner fluid line second line end into the inner sleeve, the longitudinal inner sleeve fluid passageway opening the manifold block opposite the block chamber for receiving a standard nipple fitting; and where the manifold structure includes a reclamation line in fluid communication with the containment space at one point in the manifold structure and connected to another point in the line coupling structure so that the leaked fluid re-enters the inner fluid line.

The reclamation line preferably includes a check valve for preventing backflow of fluid into the manifold and at least a portion of the manifold structure having threadedly coupled thereto a sight glass for providing visual indication of any leaked fluid within the containment space outside of the inner fluid line in the manifold structure.

A reclamation apparatus for capturing leaking hydraulic fluid in a hydraulic system having a higher pressure system end and a lower pressure system end and for delivering the captured fluid back into the system, including an inner fluid line for carrying hydraulic fluid between two points in th hydraulic system having a higher pressure inner fluid line first line end and a lower pressure inner fluid line second line end; a reinforcing sleeve sized to contain the inner fluid line and having a certain reinforcing sleeve outside diameter; an outer fluid line sized to contain the reinforcing sleeve and the inner fluid line and having an outer fluid line first line end, an outer fluid line second line end and an outer fluid line inside diameter larger than the reinforcing sleeve outside diameter so that a containment space is provided between the reinforcing sleeve and the outer fluid line; a line coupling structure connected to the inner and outer fluid line first line ends; and a manifold structure connected to the outer fluid line, the manifold structure including a manifold block in the form of an outer sleeve through which a longitudinal primary passageway extends, the primary passageway having a first passageway segment defining a block chamber which engagingly and sealingly receives the outer fluid line coupler structure for mounting the outer fluid line second line end and having a second passageway segment defining a guide segment; the manifold structure further including an inner sleeve having an inner sleeve longitudinal inner sleeve fluid passageway, the inner sleeve being sized in outer diameter to fit into the guide segment, a portion of the inner sleeve within the guide segment having a circumferential an O-ring groove, into which an O-ring is seated to make sealing contact with the guide segment, the inner sleeve being retained within the outer sleeve by inner sleeve retaining mechanism, while permitting rotation of the inner sleeve within and relative to the outer sleeve, and thus relative to the manifold block; and where the longitudinal inner sleeve fluid passageway is sized receive an axially protruding inner fluid line coupler structure for mounting the inner fluid line second line end into the inner sleeve, the longitudinal inner sleeve fluid passageway opening the manifold block opposite the block chamber for receiving a standard nipple fitting; where the manifold structure includes a reclamation line in fluid communication with the containment space at one point in the manifold structure and connected to another point in the line coupling structure so that the leaked fluid re-enters the inner fluid line.

At least a portion of the manifold structure preferably has coupled thereto a sight glass for providing visual indication of any leaked fluid within the containment space outside of the inner fluid line in the manifold structure. The reclamation line preferably includes a check valve for preventing backflow of fluid into the manifold structure.

An apparatus is yet further provided for cooling a fluid stream having a higher pressure fluid stream end and a lower pressure fluid stream end, including a fluid coolant source; an inner fluid line for carrying hydraulic fluid between two points in the hydraulic stream having a higher pressure inner fluid line first line end, a lower pressure inner fluid line second line end and inner fluid line coupler structure sealingly and engagingly mounted at the first and second line ends; an outer fluid line containing the inner fluid line and having an outer fluid line first line end, an outer fluid line second line end, outer fluid line coupler structure sealingly and engagingly mounted at the first and second line ends, and an outer fluid line inside diameter larger than the inner fluid line outside diameter so that a containment space is provided between the inner fluid line and the outer fluid line; a manifold structure connected to the inner and outer fluid line second line ends, the manifold structure including a manifold block in the form of an outer sleeve through which a longitudinal primary passageway extends, the primary passageway having a first passageway segment defining a block chamber which engagingly and sealingly receives the outer fluid line coupler structure for mounting the outer fluid line second line end and having a second passageway segment defining a guide segment; the manifold structure further including an inner sleeve having an inner sleeve longitudinal inner sleeve fluid passageway, the inner sleeve being sized in outer diameter to fit into the guide segment, a portion of the inner sleeve within the guide segment having a circumferential an O-ring groove, into which an O-ring is seated to make sealing contact with the guide segment, the inner sleeve being retained within the outer sleeve by inner sleeve retaining mechanism, while permitting rotation of the inner sleeve within and relative to the outer sleeve, and thus relative to the manifold block; and where the longitudinal inner sleeve fluid passageway is sized receive an axially protruding inner fluid line coupler structure for mounting the inner fluid line second line end into the inner sleeve, the longitudinal inner sleeve fluid passageway opening the manifold block opposite the block chamber for receiving a standard nipple fitting; and a lateral coolant line having coolant line coupler structure and being connected in fluid communication between the first lateral bore and an upstream point of the inner line coupler structure for cooling the fluid stream in the containment space.

The coolant line coupler structure preferably includes a check valve for preventing backflow of coolant into the manifold structure. The second passageway segment preferably is substantially concentric with and smaller in diameter than the block chamber, thereby defining a passageway shoulder between the block chamber and the guide segment, and where the inner sleeve has a block chamber end with a radially protruding abutment flange which abuts the passageway shoulder, where a portion of the inner sleeve protrudes longitudinally beyond the manifold structure and includes a circumferentially retaining ring groove immediately adjacent to the manifold block, into which a retaining ring is resiliently and removably fitted; the passageway shoulder, the abutment flange and the ring groove and retaining ring thereby defining the inner sleeve retaining mechanism.

The manifold block preferably is a manifold block, the chamber is internally threaded and the outer fluid line coupler structure is externally threaded for fastening into the chamber, the longitudinal inner sleeve fluid passageway is internally threaded and the inner fluid line coupler structure is externally threaded for fastening into the longitudinal inner sleeve fluid passageway, and the first lateral bore is internally threaded and the reclamation line coupler structure is externally threaded for fastening into the first lateral bore.

The apparatus preferably additionally includes a reinforcing sleeve sized to contain the inner fluid line and having a certain reinforcing sleeve outside diameter; where the outer fluid line contains both the inner fluid line and the reinforcing sleeve and has an outer fluid line first line end, an outer fluid line second line end, and the outer fluid line inside diameter being larger than the reinforcing sleeve outside diameter so that a containment space is provided between the reinforcing sleeve and the outer fluid line.

BRIEF DESCRIPTION OF THE DRAWINGS

Various other objects, advantages, and features of the invention will become apparent to those skilled in the art from the following discussion taken in conjunction with the following drawings, in which:

FIG. 1 is a side view of the apparatus with the outer fluid line shown in partial cross-section, revealing the line couplers, the coupling structure and lateral bore plug, and the manifold structure and reclamation line fitting.

FIG. 2 is a full cross-sectional view of the apparatus of FIG. 1 taken along line 2-2, revealing the inner design of the coupling and manifold structures.

FIG. 4 is a side view of the apparatus, shown with the flexible inner and outer fluid lines arched, and with the outer fluid line in partial cross-section, revealing a hypothetical rupture in the inner fluid line, and showing with arrows the direction of fluid flow within the outer fluid line and into the reclamation line. Also shown are the block chamber, the lateral bore and line second end couplers at the manifold structure.

FIG. 5 is a cross-sectional view taken along line 5-5 of FIG. 4, showing the escape of hydraulic fluid from the inner fluid line, through the hypothetical rupture, and into the annular containment space between the inner and outer fluid lines where the escaping fluid is captured and subsequently routed into the reclamation line.

FIG. 6 is a side view of another embodiment of the apparatus with the outer fluid line shown in partial cross-section.

FIG. 7 is a cross-sectional view of the apparatus of FIG. 6 taken along line 7-7, revealing the reinforcing sleeve, the line couplers, and the inner design of the coupling and manifold structures. The check valve inside the line coupler is illustrated in broken lines.

FIG. 7A is an enlarged, broken-away view of the first passageway segment shown at the left end of FIG. 7.

FIG. 8 is an end view of the apparatus of FIG. 6, showing the remote end face of the coupling structure and the standard fitting in the longitudinal fluid passageway.

FIG. 9 is a cross-sectional view of the apparatus of FIG. 7 taken along line 9-9, showing the inner fluid line, the reinforcing sleeve, the outer fluid line and the containment space.

DETAILED DESCRIPTION OF THE PREFERRED EMBODIMENTS

Figure 2A:
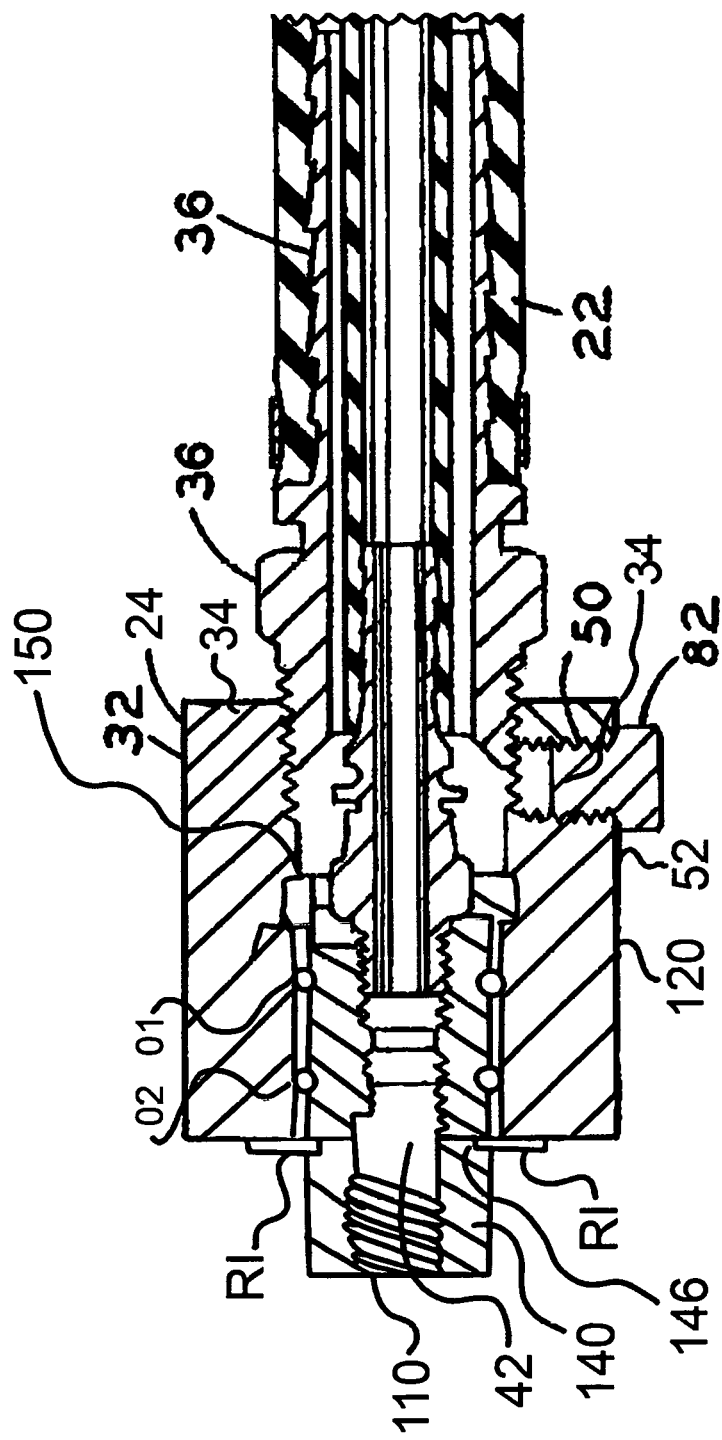
FIG. 2A is a broken-away, close-up view of the manifold structure an its inner sleeve and the first and second sealing O-rings and the outer fluid line coupler, shown at the left end in FIG. 2.

As required, detailed embodiments of the present invention are disclosed herein; however, it is to be understood that the disclosed embodiments are merely exemplary of the invention which may be embodied in various forms and utilized in various applications. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2B:
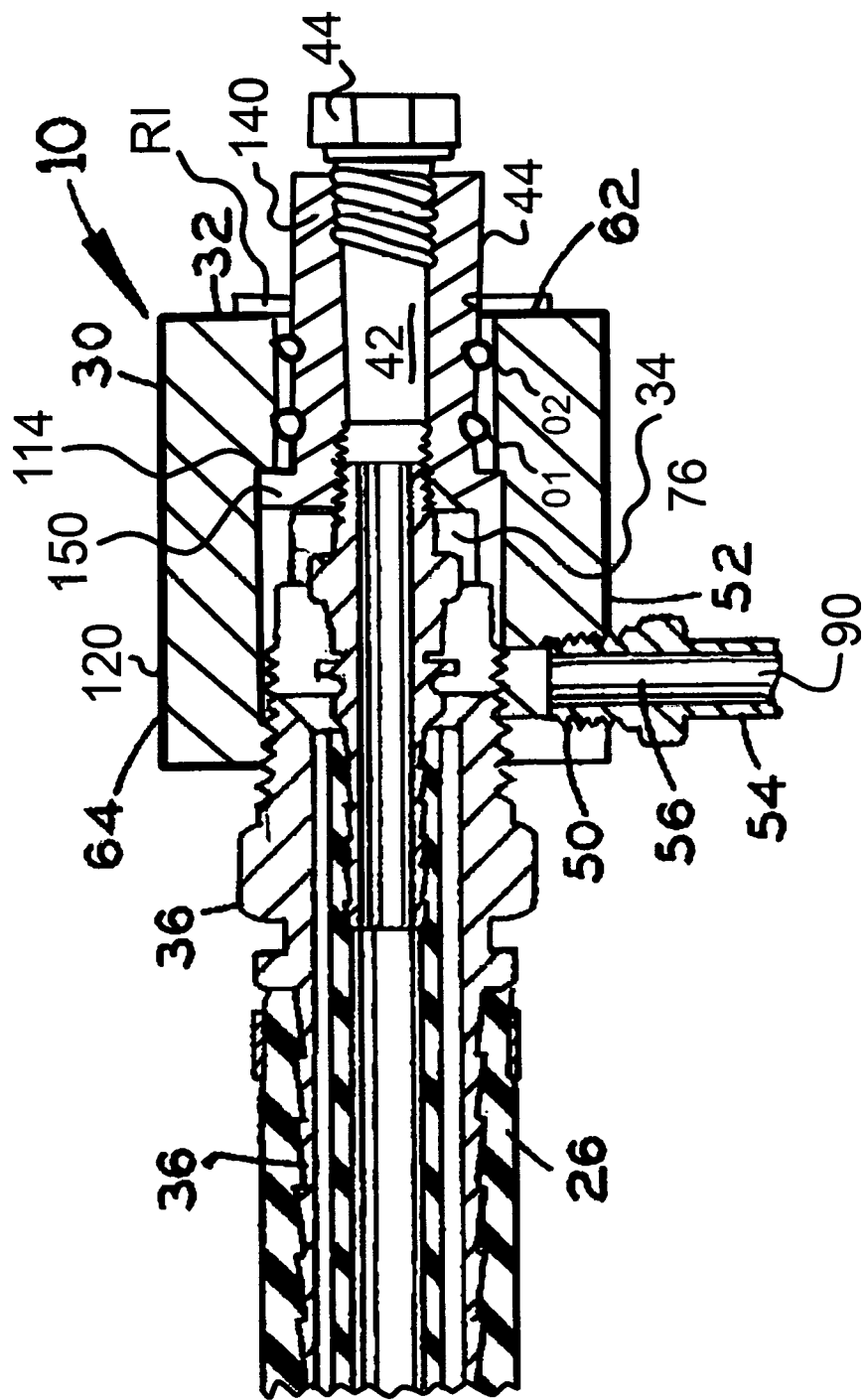
FIG. 2B is a broken-away, close-up view of the manifold structure an its inner sleeve and the first and second sealing O-rings and the outer fluid line coupler, shown at the right end in FIG. 2.
Figure 3:
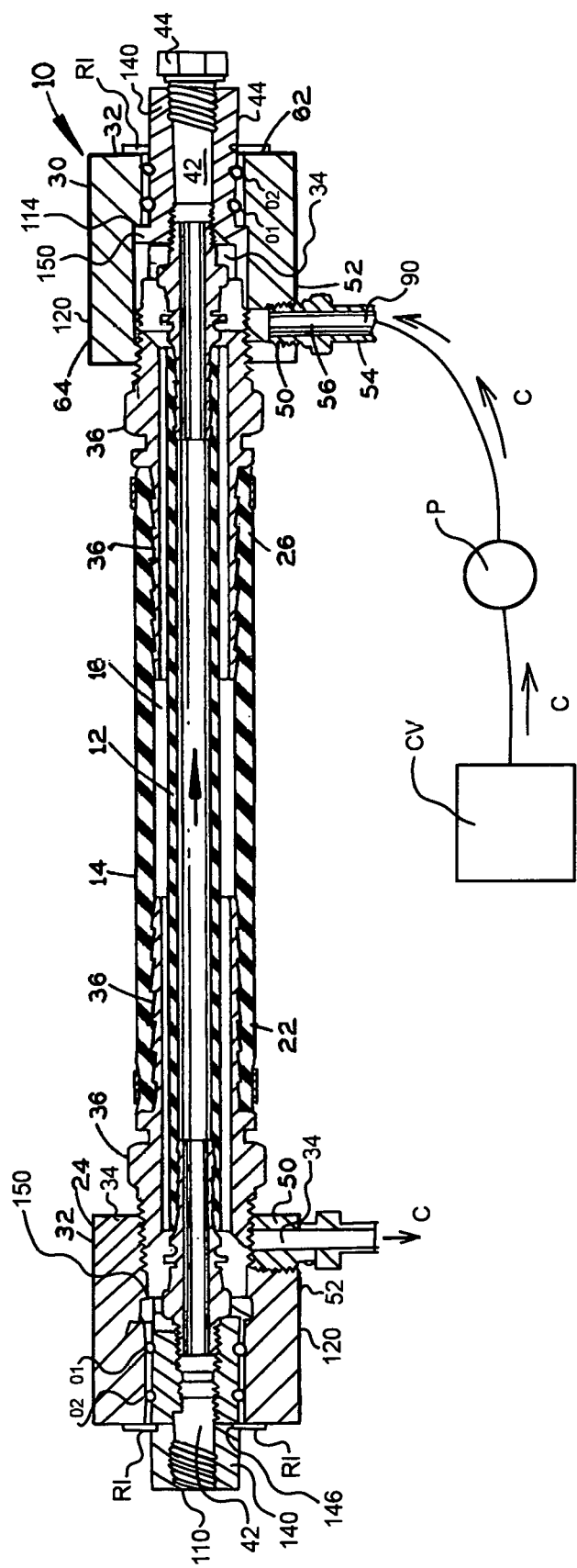
FIG. 3 is a view as in FIG. 1 additionally showing a liquid nitrogen storage tank and delivery line.
Figure 4A:
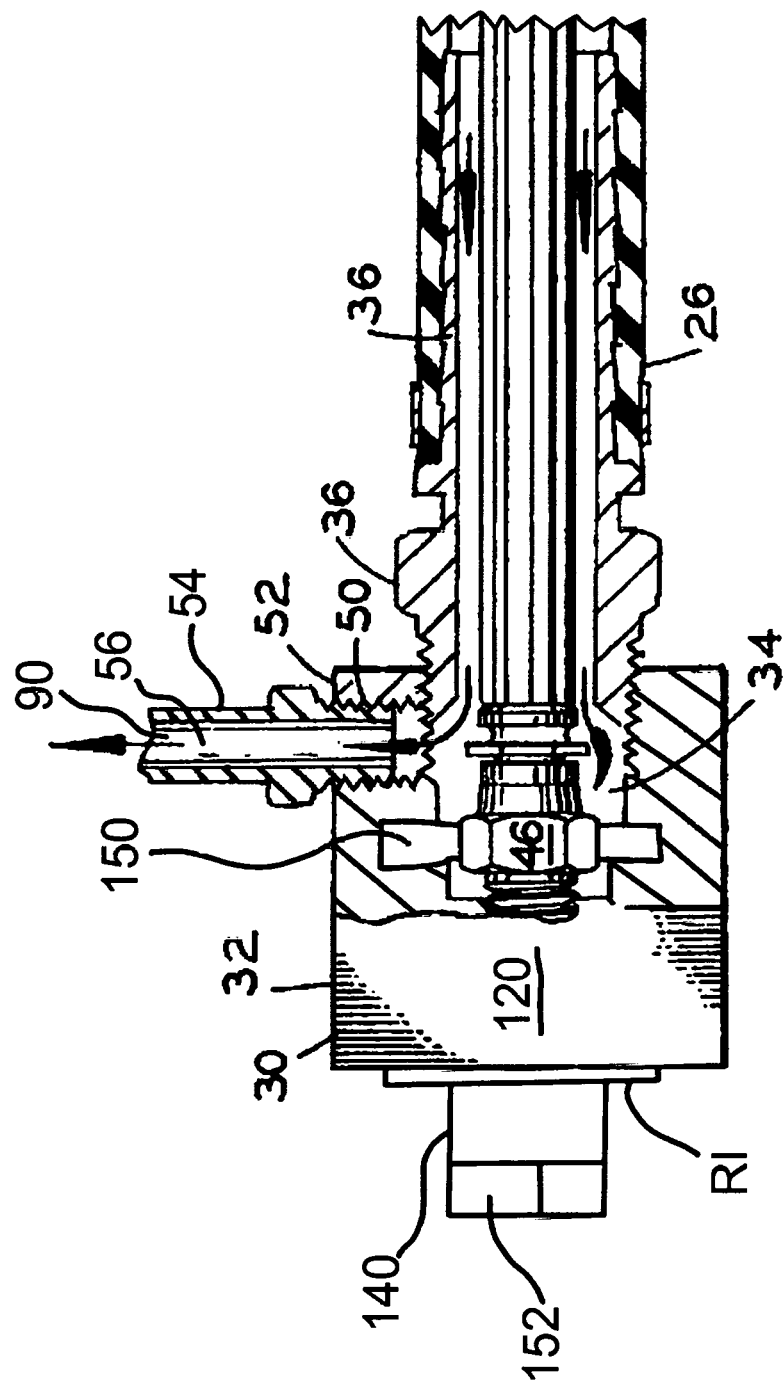
FIG. 4A is an enlarged, broken-away view of the manifold block and externally threaded coupler an fluid line coupler shown at the lower end of FIG. 4.
Figure 10:
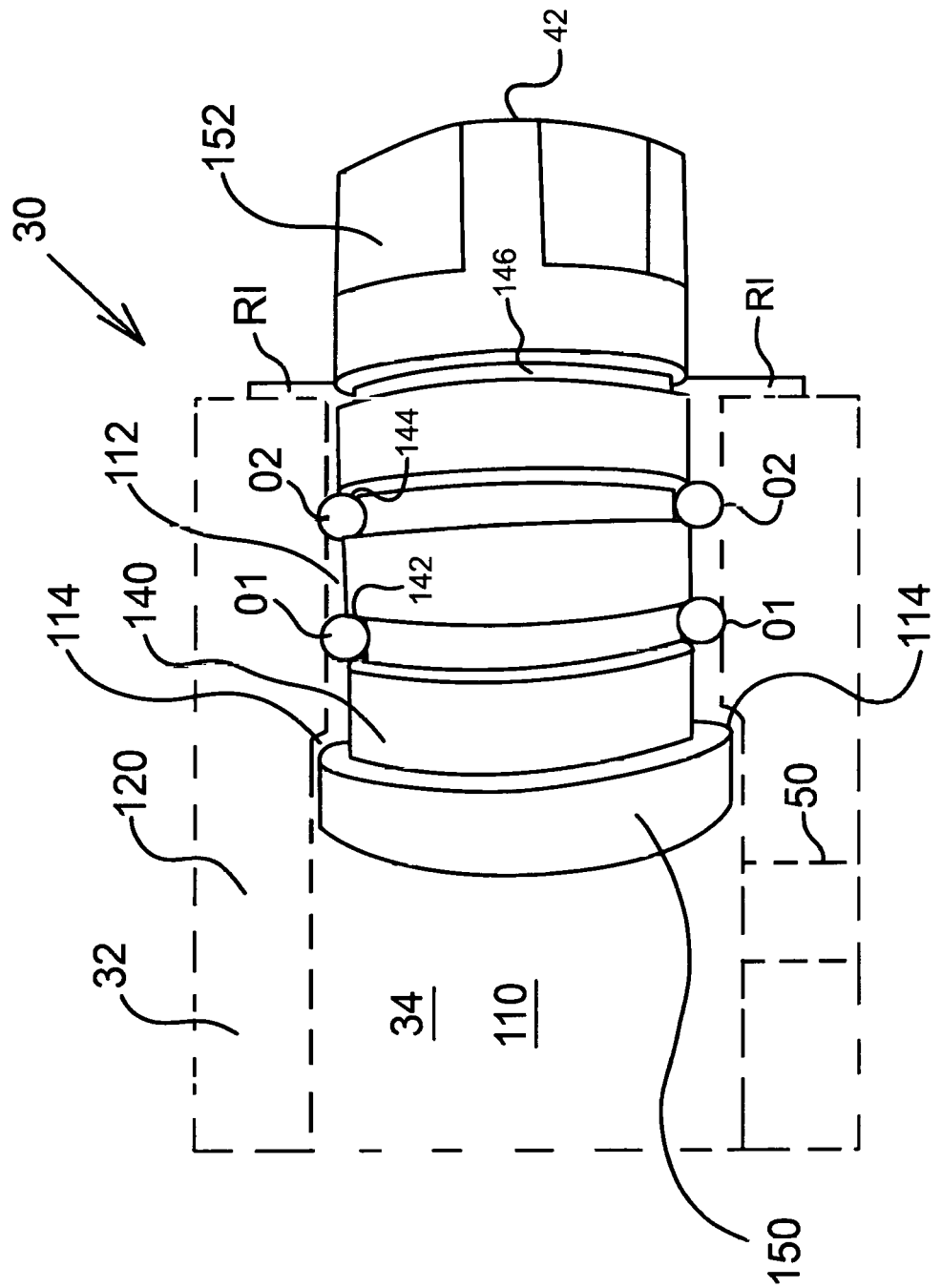
FIG. 10 is a close-up, side view of the manifold inner sleeve contained within a broken line representation of the outer sleeve.

Referring to FIGS. 1-5 and 10, a reclamation apparatus 10 is disclosed for capturing fluid leaking from a ruptured hydraulic line and for delivering the leaked fluid back into the hydraulic system.

Apparatus 10 includes in inner fluid line 12 having a certain inner fluid line 12 outside diameter, for carrying hydraulic fluid between two points in a hydraulic system such as between a fluid pump and a fluid powered mechanism. See FIGS. 1, 2 and 4. Apparatus 10 also includes an outer fluid line 14 sized to contain inner fluid line 12 and having an outer fluid line 14 inside diameter larger than the inner fluid line 12 outside diameter so that a substantially annular containment space 16 is provided between inner fluid line 12 and outer fluid line 14. Inner and outer fluid lines 12 and 14, respectively, are concentrically connected at a higher pressure first line end 22 to a coupling structure 24 and at a lower pressure second line end 26 to a manifold structure 30. Coupling structure 24 may be of conventional construction, differing only in the provision of concentric line coupler fittings.

Manifold structure 30 has two essential parts, one of which is a manifold block 32 in the form of an outer sleeve 120 through which a primary passageway 110 extends, having two passageway segments. The first passageway segment includes an internally threaded block chamber 34, which receives an externally threaded outer fluid line coupler 36 for mounting outer fluid line 14 second line end 26. The second passageway segment is a guide segment 112 in the form of a smooth bore which is concentric with and smaller in diameter than the block chamber 34, thereby defining a passageway shoulder 114 between the block chamber 34 and the guide segment 112 meet.

The other essential part of the manifold structure 30 is an inner sleeve 140 sized in outer diameter to fit with clearance into the guide segment 112. The block chamber 34 end of the inner sleeve 140 has an abutment flange 150 which abuts passageway shoulder 114. The portion of the inner sleeve 140 within the guide segment 112 has circumferential first and second O-ring grooves 142 and 144, respectively, into which first and second O-rings O1 and O2 are seated to make sealing contact with the guide segment 112 inner surface, while permitting rotation of the inner sleeve 140 within and relative to the outer sleeve 120, and thus relative to manifold block 32. A portion of the inner sleeve 140 protrudes longitudinally beyond the manifold structure 90 and includes a snap ring or retaining ring groove 146 immediately adjacent to the manifold block 32, into which a retaining ring RI is resiliently and removably fitted. The inner sleeve 140 has a longitudinal inner sleeve fluid passageway 42, which receives an axially protruding inner fluid line coupler 46 for mounting of the inner fluid line 12 second line end 26. Longitudinal inner sleeve fluid passageway 42 opens out of a face of the manifold block 32 opposite block chamber 34 and receives a standard nipple fitting 44. This concentric sleeve manifold structure 30 construction permits the inner fluid line 12 to rotate within and relative to the outer fluid line 14. Flat gripping faces 152 preferably are provided around protruding end of inner sleeve 140 for a wrench to grip and rotate inner sleeve 140 relative to outer sleeve 120. This construction also permits fast and easy assembly and disassembly of the manifold structure 30 and thus of the hydraulic system, through the removal of retaining ring RI to release the inner sleeve 140 from the outer sleeve 120, and replacement of the retaining ring RI to secure the inner sleeve 140 within the outer sleeve 120.

Block chamber 34 opens laterally into an internally threaded lateral bore 50 opening out of a block 32 side face 52 for receiving a lateral reclamation line 54 fluid receiving end 56. Reclamation line 54 is preferably made of metal and has a fluid delivery end (not shown) connected to the lower pressure side of the system pump (not shown) or to another upstream point of the system.

In the event inner fluid line 12 ruptures, escaping fluid is contained by outer fluid line 14, and fills the containment space 16 between inner and outer fluid lines 12 and 14, respectively. See FIG. 4. The fluid pressure causes the fluid escaping from the inner fluid line 12 to flow within and along outer fluid line 14, through block chamber 34 and into reclamation line 54, and to be subsequently delivered back into the system. In this way the system continues to function until the rupture R is repaired or inner fluid line 12 is replaced. Coupling structure 24 at the higher pressure end may be a second manifold block 32, the lateral bore 50 of this second block 32 being stoppered with a threaded plug 82. See FIG. 4.

Method and Apparatus of Cooling a Fluid

An alternative use of apparatus 10 is as for cooling a fluid stream flowing through the inner fluid line 12. See FIG. 3. A reservoir preferably in the form of a coolant vessel CV containing a coolant C such as liquid nitrogen is provided, and is connected to the threaded lateral bore 50 with a coolant delivery line CL. A fluid to be cooled, preferably a liquid, is delivered through the inner fluid line 12, driven by its pressure but optionally by a pump P. At the same time, the coolant C is pumped through the threaded lateral bore 50 and into annular containment space 16, so that it is contained within the outer fluid line 14 and surrounds the inner fluid line 12, drawing heat from the fluid to be cooled. The coolant C may be discharged into the atmosphere from a threaded lateral bore 50 of a second manifold structure 30, as illustrated, or delivered into a receiving vessel (not shown) located either upstream or downstream of the first manifold structure 30. The reinforcing sleeve 18 referenced below is optional for this version of the apparatus and method.

Second Preferred Embodiment

Referring to FIGS. 6-9, a reclamation apparatus 10 is disclosed for capturing fluid 1 caking from a ruptured hydraulic line and for delivering the leaked fluid back into the hydraulic system. The second embodiment includes essentially the same concentric sleeve manifold structure 30 disclosed for the first embodiment, which provides the same benefits.

Apparatus 10 includes an inner fluid line 12 for carrying hydraulic fluid between two points in a hydraulic system such as between a fluid pump and a fluid powered mechanism. See FIGS. 6 and 7. For this embodiment, apparatus 10 also includes a flexible reinforcing sleeve 18 sized to contain inner fluid line 12 and having a certain reinforcing sleeve outside diameter. Reinforcing sleeve 18 is permeable, thereby permitting fluid from a ruptured inner fluid line 12 to seep through. Apparatus 10 also includes an outer fluid line 14 sized to contain reinforcing sleeve 18 and having an outer fluid line 14 inside diameter larger than the reinforcing sleeve 18 outside diameter so that a substantially annular containment space 16 is provided between reinforcing sleeve 18 and outer fluid line 14. Inner and outer fluid lines 12 and 14, respectively, are concentrically connected at a higher pressure first line end 22 to a coupling structure 24 and at a lower pressure second line end 26 to the manifold structure 30. Coupling structure 24 may be of conventional construction, differing only in the provision of concentric line coupler fittings.

Once again, as in the first preferred embodiment, the manifold structure 30 includes a manifold block 32 in the form of an outer sleeve 120 through which a primary passageway 110 extends, having two passageway segments. The first passageway segment includes an internally threaded block chamber 34, which receives an externally threaded outer fluid line coupler 36 for mounting outer fluid line 14 second line end 26. The second passageway segment is a guide segment 112 in the form of a smooth bore which is concentric with and smaller in diameter than the block chamber 34, thereby defining a passageway shoulder 114 between the block chamber 34 and the guide segment 112 meet.

The other essential part of the manifold structure 30 is an inner sleeve 140 sized in outer diameter to fit with clearance into the guide segment 112. The block chamber 34 end of the inner sleeve 140 has an abutment flange 150 which abuts passageway shoulder 114. The portion of the inner sleeve 140 within the guide segment 112 has circumferential first and second O-ring grooves 142 and 144, respectively, into which first and second O-rings O1 and O2 are seated to make sealing contact with the guide segment 112 inner surface, while permitting rotation of the inner sleeve 140 within and relative to the outer sleeve 120, and thus relative to manifold block 32. A portion of the inner sleeve 140 protrudes longitudinally beyond the manifold structure 90 and includes a snap ring or retaining ring groove 146 immediately adjacent to the manifold block 32, into which a retaining ring RI is resiliently and removably fitted. The inner sleeve 140 has a longitudinal inner sleeve fluid passageway 42, which receives an axially protruding inner fluid line coupler 46 for mounting of the inner fluid line 12 second line end 26. Longitudinal inner sleeve fluid passageway 42 opens out of a face of the manifold block 32 opposite block chamber 34 and receives a standard nipple fitting 44. The benefits of this construction are as stated for the first preferred embodiment.

Block chamber 34 opens laterally into first and second internally threaded lateral bores 50-opening out of opposite block 32 side faces 52, for receiving a lateral reclamation line 54 externally threaded coupler 56 and an externally threaded sight glass 57. Reclamation line 54 is preferably made of metal and has a fluid delivery end connected to the reservoir feeding the lower pressure side of the system pump or to another upstream point of the system. Sight glass 57 is structured to provide visual indication of fluid outside of the inner fluid line 12.

Reclamation line coupler 56 includes a longitudinal fluid passageway 90 having a certain inside diameter and leading to a chamber having a certain inside diameter greater than the inside diameter of the reclamation line coupler 56 longitudinal fluid passageway 90. See FIG. 13 and the disclosure of U.S. Pat. No. 5,884,657, where this is illustrated, and which is incorporated by reference. The inside diameters of the reclamation line coupler 56 chamber and longitudinal fluid passageway 90 define a flanged portion. Reclamation line coupler 56 also includes a check valve 58 for preventing backflow of fluid into the manifold structure 30. Check valve 58 includes a spring mounted longitudinally within the reclamation line coupler 56 chamber and a circular disk located between the flanged portion and the spring. The disk has an outside diameter greater than the reclamation line coupler 56 longitudinal fluid passageway inside diameter and less than the reclamation line coupler 56 chamber 92 inside diameter. The spring is structured and disposed to press the disk against the flanged portion until fluid buildup within the reclamation line coupler 56 longitudinal fluid passageway causes the disk to compress the spring, thereby allowing fluid to flow through the reclamation line coupler 56 and into the reclamation line 54. The disk could be replaced with a ball or other similar structure.

In the event inner fluid line 12 ruptures, escaping fluid seeps through reinforcing sleeve 18, is contained by outer fluid line 14, and fills the containment space 16 between reinforcing sleeve 18 and outer fluid line 14. The reinforcing sleeve 18 prevents the outer fluid line 14 from also rupturing due to the force and pressure from the inner fluid line 12 rupture. The fluid pressure causes the fluid escaping from the inner fluid line 12 to flow within and along outer fluid line 14, through block chamber 34 and into the longitudinal fluid passageway of reclamation line coupler 56. Fluid buildup within the reclamation line coupler 56 longitudinal fluid passageway causes the disk to compress the spring, thereby allowing fluid to flow through the reclamation line coupler 56 and into the reclamation line 54 to be subsequently delivered back into the system. Only two PSI of pressure is needed to compress the spring. In this way the system continues to function until the rupture K is repaired or inner fluid line 12 is replaced. Coupling structure 24 at the higher pressure end may be a second manifold block 32. Fittings 82 receive the tubes.

Inner and outer fluid lines 12 and 14, respectively, are preferably made of high pressure flexible tubing. They may also be formed of metal, plastic or any other suitable material. Reinforcing sleeve 18 is preferably made of steel and is structured to withstand pressures exceeding 2500 PSI caused by the flow of fluid within the inner fluid line 12 during equipment operation. It may also be made of some other metal, plastic or any other suitable material structured to withstand this pressure.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A reclamation apparatus for capturing leaking hydraulic fluid in a hydraulic system having a higher pressure system end and a lower pressure system end and for delivering the captured fluid back into the system, comprising:

an inner fluid line for carrying hydraulic fluid between two points in said hydraulic system having a higher pressure inner fluid line first line end, a lower pressure inner fluid line second line end and inner fluid line coupler means sealingly and engagingly mounted at said first and second line ends;

a reinforcing sleeve sized to contain said inner fluid line and having a certain reinforcing sleeve outside diameter;

an outer fluid line containing said inner fluid line and said reinforcing sleeve and having an outer fluid line first line end, an outer fluid line second line end, outer fluid line coupler means sealingly and engagingly mounted at said first and second line ends, and an outer fluid line inside diameter larger than said reinforcing sleeve outside diameter such that a containment space is provided between said reinforcing sleeve and outer fluid line;

a manifold structure connected to said inner and outer fluid line second line ends, said manifold structure including a manifold block in the form of an outer sleeve through which a longitudinal primary passageway extends, said primary passageway having a first passageway segment defining a block chamber which engagingly and sealingly receives said outer fluid line coupler means for mounting said outer fluid line second line end and having a second passageway segment defining a guide segment;

said manifold structure further including an inner sleeve having an inner sleeve longitudinal inner sleeve fluid passageway, said inner sleeve being sized in outer diameter to fit into said guide segment, a portion of said inner sleeve within said guide segment having a circumferential an O-ring groove, into which an O-ring is seated to make sealing contact with said guide segment, said inner sleeve being retained within said outer sleeve by inner sleeve retaining means, while permitting rotation of said inner sleeve within and relative to said outer sleeve, and thus relative to said manifold block;

and wherein said longitudinal inner sleeve fluid passageway is sized receive an axially protruding inner fluid line coupler means for mounting said inner fluid line second line end into said inner sleeve, said longitudinal inner sleeve fluid passageway opening said manifold block opposite said block chamber for receiving a standard nipple fitting;

and a lateral reclamation line having reclamation line coupler means and being connected in fluid communication between said first lateral bore and an upstream point of said inner line coupler means for reclaiming any leaked fluid in said containment space.

2. An apparatus according to claim 1, wherein said reclamation line coupler means comprises a check valve for preventing backflow of fluid into said manifold structure.

3. An apparatus according to claim 1, wherein said second passageway segment is substantially concentric with and smaller in diameter than said block chamber, thereby defining a passageway shoulder between said block chamber and said guide segment, and wherein said inner sleeve has a block chamber end with a radially protruding abutment flange which abuts said passageway shoulder, wherein a portion of said inner sleeve protrudes longitudinally beyond said manifold structure and includes a circumferentially retaining ring groove immediately adjacent to said manifold block, into which a retaining ring is resiliently and removably fitted;

said passageway shoulder, said abutment flange and said ring groove and retaining ring thereby defining said inner sleeve retaining means.

4. An apparatus according to claim 1, wherein said manifold structure is a manifold block, said chamber is internally threaded and said outer fluid line coupler means is externally threaded for fastening into said chamber, said longitudinal inner sleeve fluid passageway is internally threaded and said inner fluid line coupler means is externally threaded for fastening into said longitudinal inner sleeve fluid passageway, and said first lateral bore is internally threaded and said reclamation line coupler means is externally threaded for fastening into said first lateral bore.

5. An apparatus according to claim 1, wherein the inner fluid line coupler means comprise inner fluid line coupler fittings, and wherein the outer fluid line coupler means comprise outer fluid line coupler fittings.

6. An apparatus according to claim 1, wherein said guide segment is a smooth bore.

7. An apparatus according to claim 1, wherein said portion of said inner sleeve protruding longitudinally beyond said manifold comprises flat gripping faces for a wrench to grip and rotate said inner sleeve relative to said outer sleeve.

8. An apparatus according to claim 1, wherein said coupling means comprises a second said manifold structure, wherein said first lateral bore is closed and sealed with plug means.

9. An apparatus according to claim 1, wherein said manifold structure comprises a second lateral bore extending between said block chamber and a second side of said manifold block opposite said first side of said manifold block and a sight glass for providing visual indication of fluid outside of said inner fluid line, said second lateral bore being internally threaded and said sight glass externally threaded for fastening into said second lateral bore.

10. A reclamation apparatus for capturing leaking hydraulic fluid in a hydraulic system having a higher pressure system end and a lower pressure system end and for delivering the captured fluid back into the system, comprising:

an inner fluid line for carrying hydraulic fluid between two points in said hydraulic system having a higher pressure first line end and a lower pressure second line end;

a reinforcing sleeve sized to contain said inner fluid line and having a certain reinforcing sleeve outside diameter;

an outer fluid line sized to contain said reinforcing sleeve and said inner fluid line and having a first line end, a second line end and an outer fluid line inside diameter larger than said reinforcing sleeve outside diameter such that a containment space is provided between said reinforcing sleeve and said outer fluid line;

a line coupling structure connected to said inner and outer fluid line first line ends;

a manifold structure connected to said outer fluid line, said manifold structure comprising a manifold block in the form of an outer sleeve through which a longitudinal primary passageway extends, said primary passageway having a first passageway segment defining a block chamber which engagingly and sealingly receives said outer fluid line coupler means for mounting said outer fluid line second line end and having a second passageway segment defining a guide segment;

said manifold structure further including an inner sleeve having an inner sleeve longitudinal inner sleeve fluid passageway, said inner sleeve being sized in outer diameter to fit into said guide segment, a portion of said inner sleeve within said guide segment having a circumferential an O-ring groove, into which an O-ring is seated to make sealing contact with said guide segment, said inner sleeve being retained within said outer sleeve by inner sleeve retaining means, while permitting rotation of said inner sleeve within and relative to said outer sleeve, and thus relative to said manifold block;

wherein said longitudinal inner sleeve fluid passageway is sized receive an axially protruding inner fluid line coupler means for mounting said inner fluid line second line end into said inner sleeve, said longitudinal inner sleeve fluid passageway opening said manifold block opposite said block chamber for receiving a standard nipple fitting;

and wherein said manifold structure comprises a reclamation line in fluid communication with said containment space at one point in said manifold structure and connected to another point in said line coupling structure such that the leaked fluid re-enters said inner fluid line.

11. An apparatus according to claim 10, wherein said reclamation line comprises a check valve for preventing backflow of fluid into said manifold and at least a portion of said manifold structure having threadedly coupled thereto a sight glass for providing visual indication of any leaked fluid within said containment space outside of said inner fluid line in said manifold structure.

12. A reclamation apparatus for capturing leaking hydraulic fluid in a hydraulic system having a higher pressure system end and a lower pressure system end and for delivering the captured fluid back into the system, comprising:
an inner fluid line for carrying hydraulic fluid between two points in said hydraulic system having a higher pressure inner fluid line first line end and a lower pressure inner fluid line second line end;
a reinforcing sleeve sized to contain said inner fluid line and having a certain reinforcing sleeve outside diameter;
an outer fluid line sized to contain said reinforcing sleeve and said inner fluid line and having an outer fluid line first line end, an outer fluid line second line end and an outer fluid line inside diameter larger than said reinforcing sleeve outside diameter such that a containment space is provided between said reinforcing sleeve and said outer fluid line;
a line coupling structure connected to said inner and outer fluid line first line ends,
and a manifold structure connected to said outer fluid line, said manifold structure comprising a manifold block in the form of an outer sleeve through which a longitudinal primary passageway extends, said primary passageway having a first passageway segment defining a block chamber which engagingly and sealingly receives said outer fluid line coupler means for mounting said outer fluid line second line end and having a second passageway segment defining a guide segment;
said manifold structure further including an inner sleeve having an inner sleeve longitudinal inner sleeve fluid passageway, said inner sleeve being sized in outer diameter to fit into said guide segment, a portion of said inner sleeve within said guide segment having a circumferential an O-ring groove, into which an O-ring is seated to make sealing contact with said guide segment, said inner sleeve being retained within said outer sleeve by inner sleeve retaining means, while permitting rotation of said inner sleeve within and relative to said outer sleeve, and thus relative to said manifold block;
and wherein said longitudinal inner sleeve fluid passageway is sized receive an axially protruding inner fluid line coupler means for mounting said inner fluid line second line end into said inner sleeve, said longitudinal inner sleeve fluid passageway opening said manifold block opposite said block chamber for receiving a standard nipple fitting;
wherein said manifold structure comprises a reclamation line in fluid communication with said containment space at one point in said manifold structure and connected to another point in said line coupling structure such that the leaked fluid re-enters said inner fluid line.

13. An apparatus according to claim 12 at least a portion of said manifold structure having coupled thereto a sight glass for providing visual indication of any leaked fluid within said containment space outside of said inner fluid line in said manifold structure.

14. An apparatus according to claim 12, wherein said reclamation line includes a check valve for preventing backflow of fluid into said manifold structure.

15. An apparatus for cooling a fluid stream having a higher pressure fluid stream end and a lower pressure fluid stream end, comprising:
a fluid coolant source;
an inner fluid line for carrying hydraulic fluid between two points in said hydraulic stream having a higher pressure inner fluid line first line end, a lower pressure inner fluid line second line end and inner fluid line coupler means sealingly and engagingly mounted at said first and second line ends;
an outer fluid line containing said inner fluid line and having an outer fluid line first line end, an outer fluid line second line end, outer fluid line coupler means sealingly and engagingly mounted at said first and second line ends, and an outer fluid line inside diameter larger than said inner fluid line outside diameter such that a containment space is provided between said inner fluid line and said outer fluid line;
a manifold structure connected to said inner and outer fluid line second line ends, said manifold structure including a manifold block in the form of an outer sleeve through which a longitudinal primary passageway extends, said primary passageway having a first passageway segment defining a block chamber which engagingly and sealingly receives said outer fluid line coupler means for mounting said outer fluid line second line end and having a second passageway segment defining a guide segment;
said manifold structure further including an inner sleeve having an inner sleeve longitudinal inner sleeve fluid passageway, said inner sleeve being sized in outer diameter to fit into said guide segment, a portion of said inner sleeve within said guide segment having a circumferential an O-ring groove, into which an O-ring is seated to make sealing contact with said guide segment, said inner sleeve being retained within said outer sleeve by inner sleeve retaining means, while permitting rotation of said inner sleeve within and relative to said outer sleeve, and thus relative to said manifold block;
and wherein said longitudinal inner sleeve fluid passageway is sized receive an axially protruding inner fluid line coupler means for mounting said inner fluid line second line end into said inner sleeve, said longitudinal inner sleeve fluid passageway opening said manifold block opposite said block chamber for receiving a standard nipple fitting;
and a lateral coolant line having coolant line coupler means and being connected in fluid communication between said first lateral bore and an upstream point of said inner line coupler means for cooling the fluid stream in said containment space.

16. An apparatus according to claim 15, wherein said coolant line coupler means comprises a check valve for preventing backflow of coolant into said manifold structure.

17. An apparatus according to claim 15, wherein said second passageway segment is substantially concentric with and smaller in diameter than said block chamber, thereby defining a passageway shoulder between said block chamber and said guide segment, and wherein said inner sleeve has a block chamber end with a radially protruding abutment flange which abuts said passageway shoulder, wherein a portion of said inner sleeve protrudes longitudinally beyond said manifold structure and includes a circumferentially retaining ring groove immediately adjacent to said manifold block, into which a retaining ring is resiliently and removably fitted;

said passageway shoulder, said abutment flange and said ring groove and retaining ring thereby defining said inner sleeve retaining means.

18. An apparatus according to claim 15, wherein said manifold structure comprises a manifold block, said chamber is internally threaded and said outer fluid line coupler means is externally threaded for fastening into said chamber, said longitudinal inner sleeve fluid passageway is internally threaded and said inner fluid line coupler means is externally threaded for fastening into said longitudinal inner sleeve fluid passageway, and said first lateral bore is internally threaded and said reclamation line coupler means is externally threaded for fastening into said first lateral bore.

19. An apparatus according to claim 15, additionally comprising a reinforcing sleeve sized to contain said inner fluid line and having a certain reinforcing sleeve outside diameter;

wherein said outer fluid line contains both said inner fluid line and said reinforcing sleeve and has an outer fluid line first line end, an outer fluid line second line end, and said outer fluid line inside diameter being larger than said reinforcing sleeve outside diameter such that a containment space is provided between said reinforcing sleeve and said outer fluid line.

\* \* \* \* \*